United States Patent [19]
Kueneman et al.

[11] Patent Number: 5,509,846
[45] Date of Patent: Apr. 23, 1996

[54] DISPOSABLE BIODEGRADABLE BEE HIVE

[75] Inventors: Thomas C. Kueneman, Freedom; Richard D. Nelson; Steven D. Nelson, both of Watsonville, all of Calif.

[73] Assignee: Bees West, Inc., Freedom, Calif.

[21] Appl. No.: 345,582

[22] Filed: Nov. 28, 1994

[51] Int. Cl.$^6$ .......................... A01K 47/00; A01K 47/06
[52] U.S. Cl. ..................... 449/11; 449/25; 449/30
[58] Field of Search ..................... 449/3, 9, 11, 13, 449/25, 27, 28, 30

[56] References Cited

U.S. PATENT DOCUMENTS

| | | | |
|---|---|---|---|
| 111,696 | 2/1871 | Stearns | 449/25 |
| 1,889,184 | 11/1932 | Siemers | 449/30 |
| 2,193,741 | 3/1940 | Roberts, Jr. | 449/11 |
| 2,599,141 | 6/1952 | Taylor | 449/13 X |
| 4,199,832 | 4/1980 | Glasscock et al. | |
| 4,524,476 | 6/1985 | Adams, IV | 449/27 |
| 5,211,597 | 5/1993 | Scott et al. | 449/27 |

FOREIGN PATENT DOCUMENTS

| | | | |
|---|---|---|---|
| 143805 | 10/1948 | Australia | 449/25 |
| 1060157 | 12/1983 | U.S.S.R. | 449/28 |

Primary Examiner—Robert P. Swiatek
Attorney, Agent, or Firm—Christie, Parker & Hale

[57] ABSTRACT

A disposable, biodegradable beehive which comprises an enclosure of wax-coated cardboard. The enclosure includes an opening to allow the bees to enter or exit the beehive and a closure for the opening. Small ventilation holes, relative to the size of a bee, are provided to allow air to circulate. A plurality of cardboard layers are fitted to the bottom of the enclosure with a section of the layers removed to form a nest pocket or a dry feed pocket. A float feeder is attached to the enclosure with the feeder element internal to the enclosure, while the main body of the feeder is external to the enclosure to allow the feeder to be supplied with external liquid feed.

12 Claims, 5 Drawing Sheets

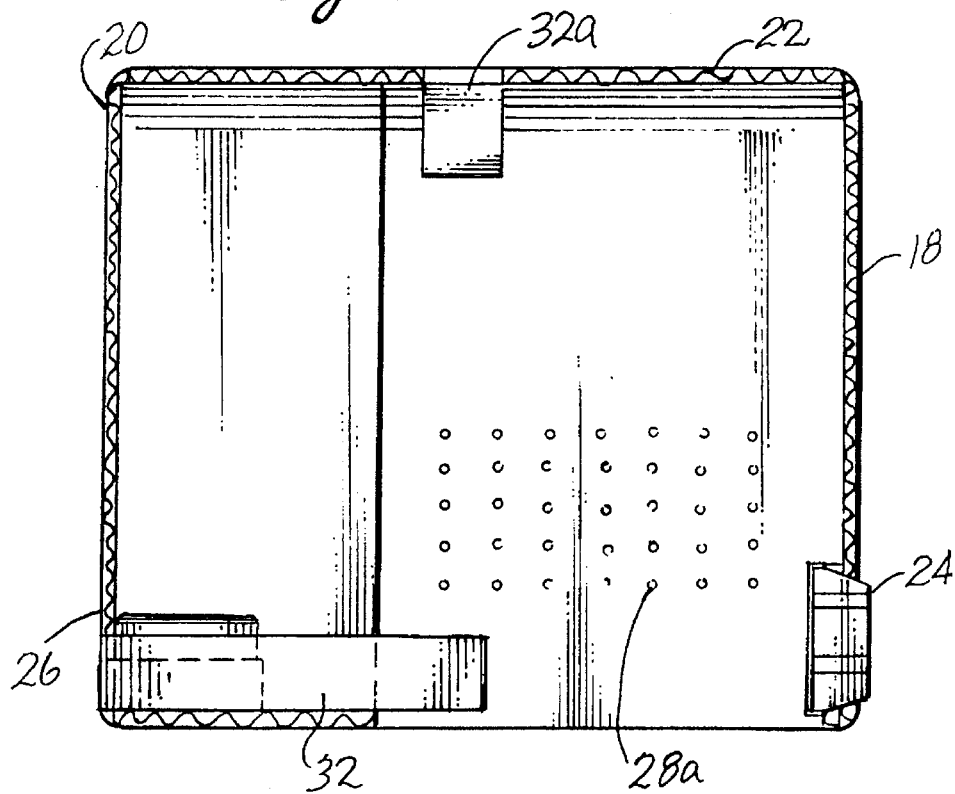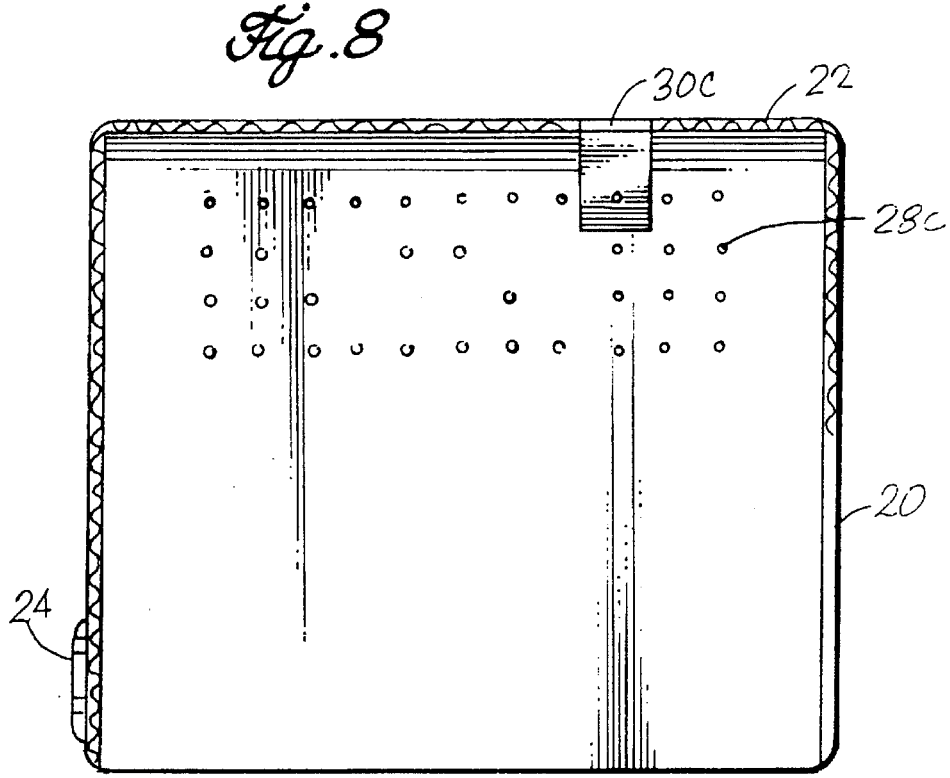

DISPOSABLE BIODEGRADABLE BEE HIVE

FIELD OF THE INVENTION

The present invention relates generally to the field of beehives, and in particular to a disposable, biodegradable beehive constructed out of waxed cardboard.

BACKGROUND OF THE INVENTION

Beehives traditionally have been made from wood or styrofoam. However, the need has arisen for low cost, disposable beehives which are also biodegradable and which can be easily transported to areas in need of pollination services, such as agricultural fields, orchards, and greenhouses. Prior art attempts to overcome the disadvantages of wooden beehives include the use of plastic or synthetic resins, such as styrofoam, to construct lightweight, portable beehives. Two such beehives are described in U.S. Pat. No. 4,199,832 and U.S. Pat. No. 5,211,597. However, beehives made from plastic or synthetic resins are expensive and are not biodegradable.

The present invention addresses the need for an economic and disposable beehive which is also portable and biodegradable. Beehives constructed from cardboard are more economical to produce than plastic or synthetic beehives. However, if the beehives were only constructed of plain cardboard, the bees could "gnaw" their way through the cardboard. Moreover, the hive would not withstand the effects of rain or other moisture. Therefore, it is necessary to provide a protective wax coating on the cardboard from which the hive is constructed to prevent the bees from affecting the integrity of the hive enclosure and to protect the cardboard against moisture and other elements.

BRIEF SUMMARY OF THE INVENTION

In the preferred embodiment of the invention, the beehive is made of wax-coated cardboard which is disposable and biodegradable. The beehive comprises an enclosure, open on top, made of wax-coated cardboard. The open top is covered by a lid comprising waxed cardboard and fastened to the enclosure. The enclosure has an opening which allows the bees to enter or exit the enclosure. In the presently preferred embodiment in order to confine the bees inside the enclosure, a plastic strip is affixed within a slot in the enclosure so that by sliding the plastic strip the opening can be covered or uncovered. A float feeder, comprising a main body and a feeder element, is advantageously attached to the enclosure with the feeder element internal to the enclosure, while the main body of the feeder is external to the enclosure to allow the feeder to be supplied with external liquid feed. Ventilation holes are provided, suitably arranged around the enclosure, to allow air to flow between the inside and outside of the enclosure. The ventilation holes are sufficiently small in size to prevent bees from exiting the enclosure through the holes. The bottom of the enclosure also may be fitted with a plurality of cardboard layers with a small volume of the layers removed to form a pocket in which the bees may nest. Additional nest pockets, or pockets for storing dry feed, may be included by removing the desired volume of cardboard layers.

The beehive is economical to produce and is thereby disposable. The float feeder and the sliding plastic closure strip may be advantageously made from a recyclable plastic, to facilitate re-use or recycling of the plastic parts.

BRIEF DESCRIPTION OF THE DRAWINGS

FIG. 7 is an end view of the disposable beehive illustrating the placement of the float feeder and ventilation holes.

FIG. 8 is an end view of the disposable beehive illustrating one suitable placement of the ventilation holes.

DETAILED DESCRIPTION

The present invention is a disposable and portable beehive which is also substantially biodegradable. In a preferred embodiment shown in FIG. 1, the beehive 10 comprises an enclosure 20 and a lid 22 made from wax-coated cardboard. The enclosure 20 and lid 22 are preferably corrugated cardboard coated with wax on both sides to prevent the bees from "gnawing" their way out, and also to protect the cardboard from moisture. The lid 22 is attached to the enclosure 20 by any suitable means such as by use of adhesive tape 30a–d. As illustrated in FIGS. 4, 5, 7 and 8, ventilation holes 28a–d may be provided on four sides of the enclosure 20 to provide desirable air flow between the inside and outside of the beehive 10.

Figure 1:
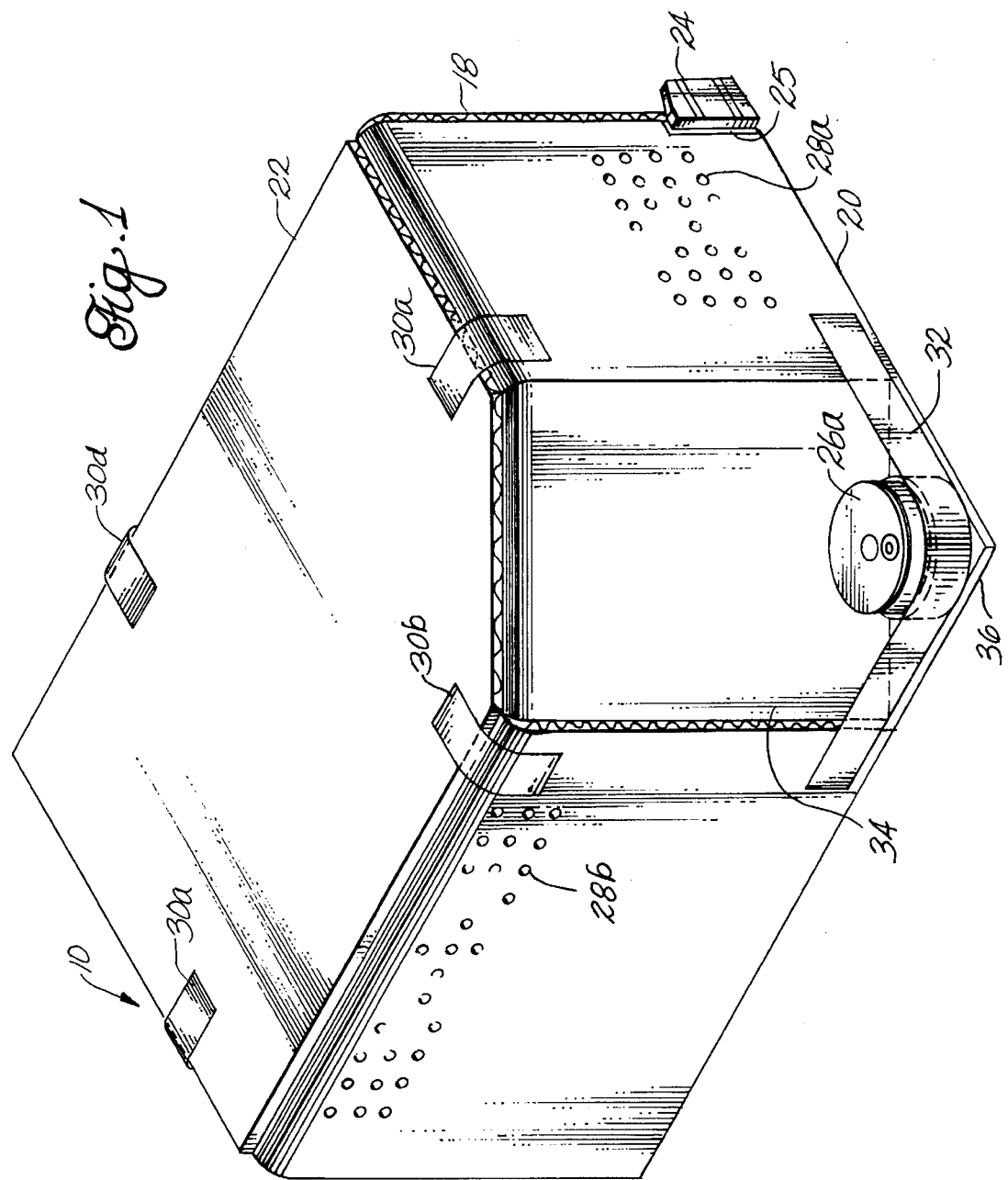
FIG. 1 is a perspective view of the disposable beehive.
Figure 6:
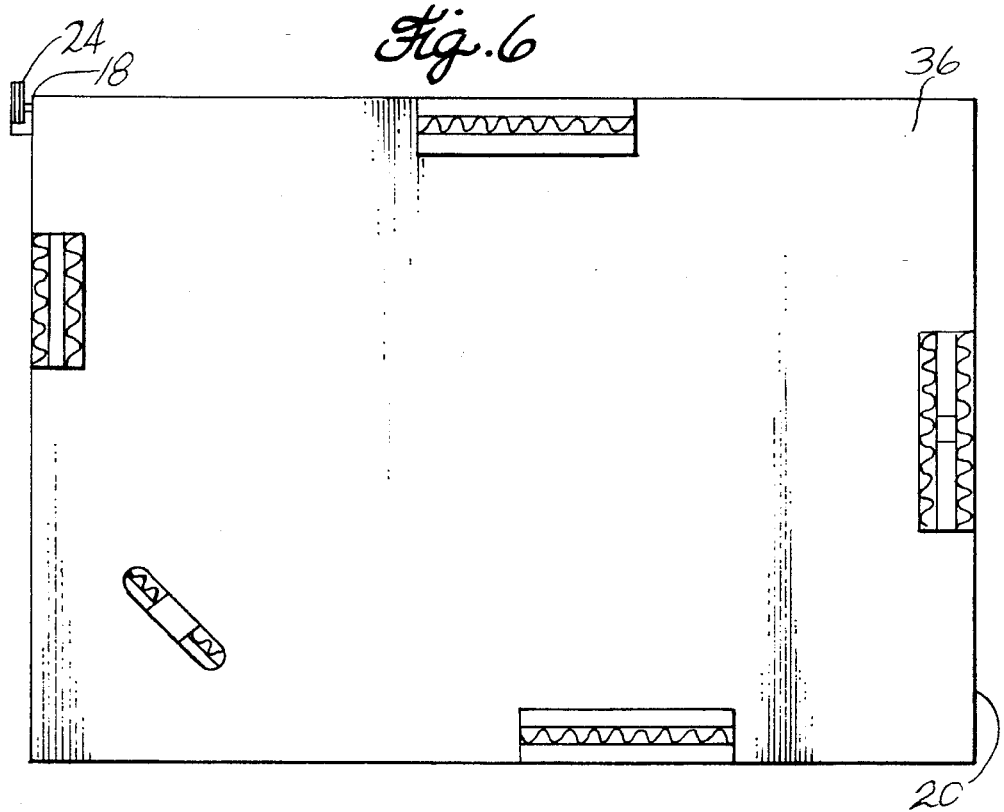
FIG. 6 is a bottom view of the disposable beehive.

The enclosure 20 is generally rectangular and includes an angled corner 34. As shown in FIG. 6, the bottom 36 of the enclosure 20 is not angled so a triangular section 36 shown in FIG. 1 is formed. The float feeder 27, comprising a main body 26a and a feeder element 26b, is a convenient means to provide liquid feed to the bees inside the hive. The float feeder main body 26a is attached to the enclosure 20 by any suitable means such as adhesive tape 32 and is supported by the triangular section 36. An external source of liquid feed, not shown, attaches to the float feeder main body to supply the beehive with liquid feed. The feeder element 26b fits through the opening 46 in the angled corner 34, as shown in FIG. 2, so that the bees can be supplied with liquid feed inside the enclosure 20.

Figure 2:
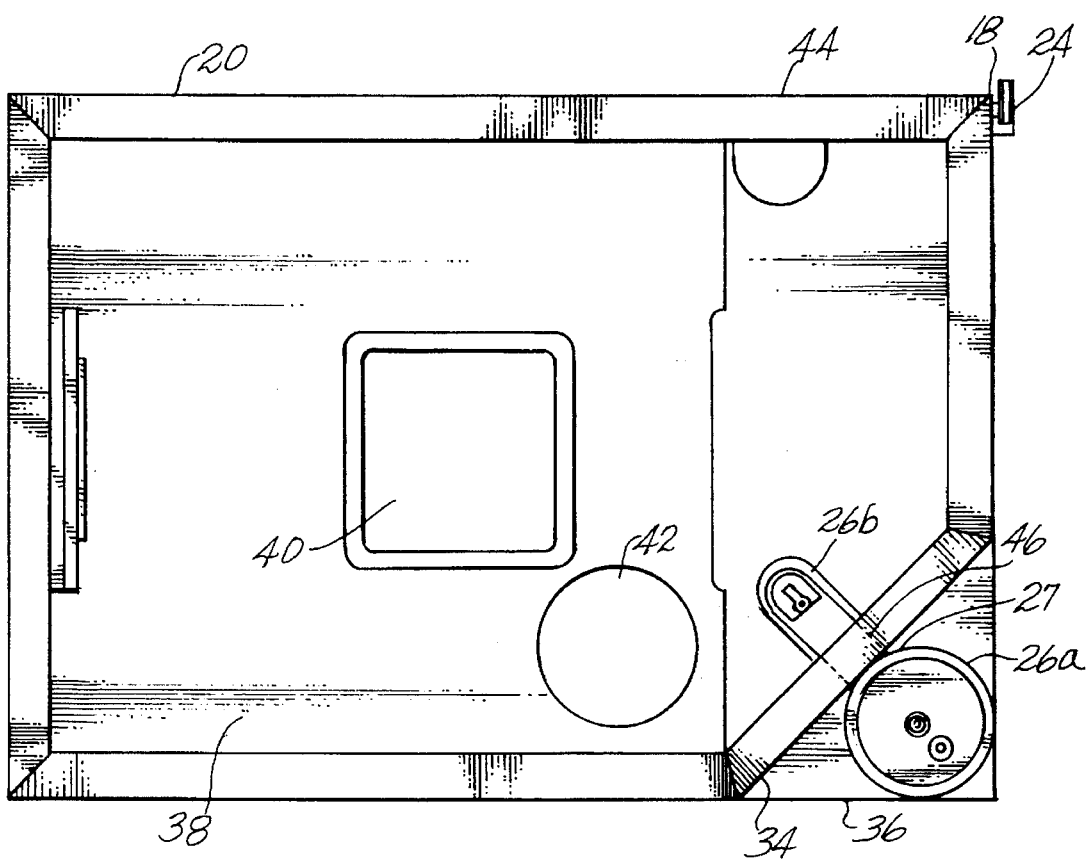
FIG. 2 is a top view of the disposable beehive with the lid removed.
Figure 3:
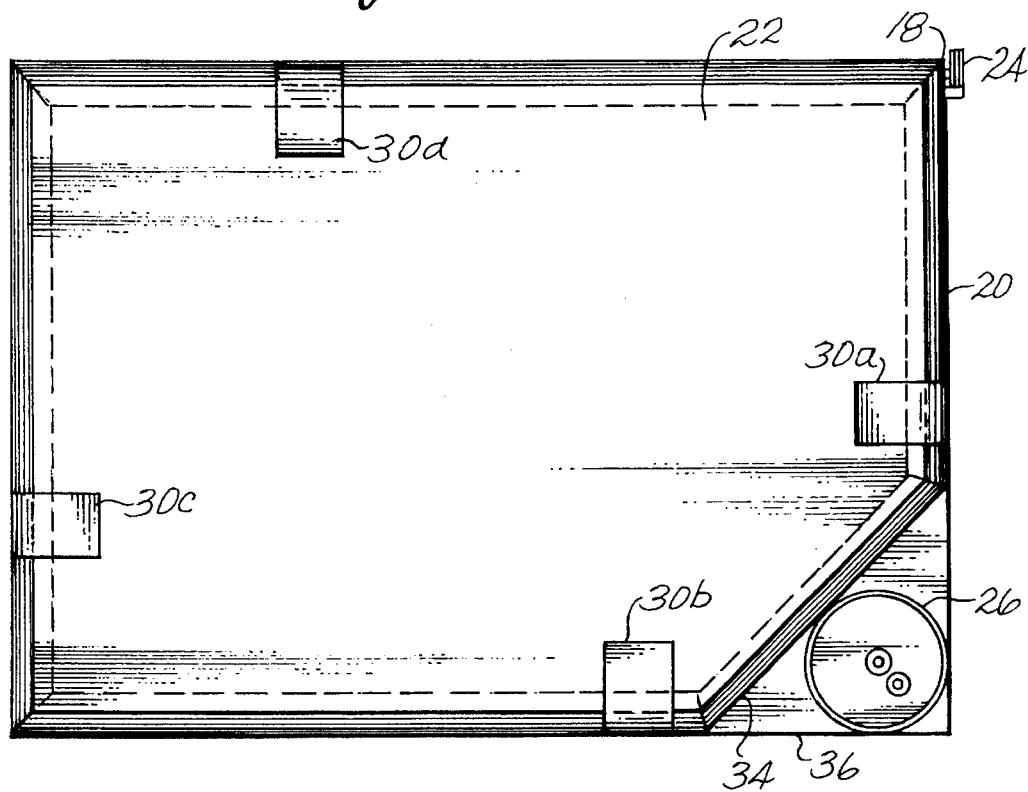
FIG. 3 is a top view of the disposable beehive with the lid attached.
Figure 4:
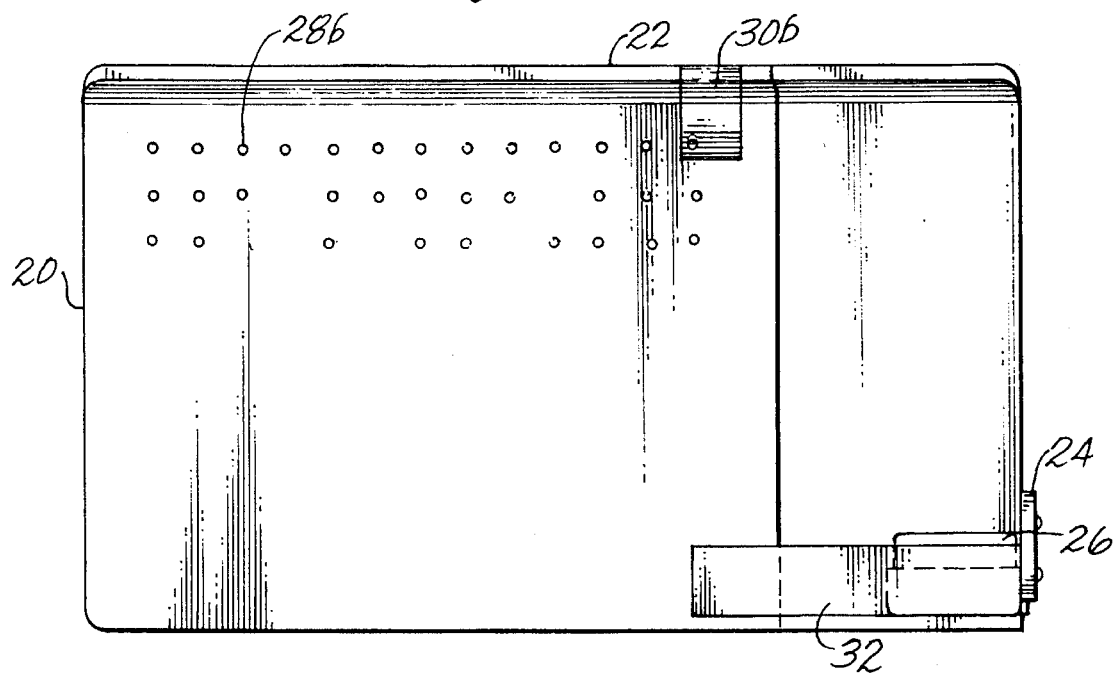
FIG. 4 is a side view of the disposable beehive illustrating the placement of the float feeder and ventilation holes.
Figure 5:
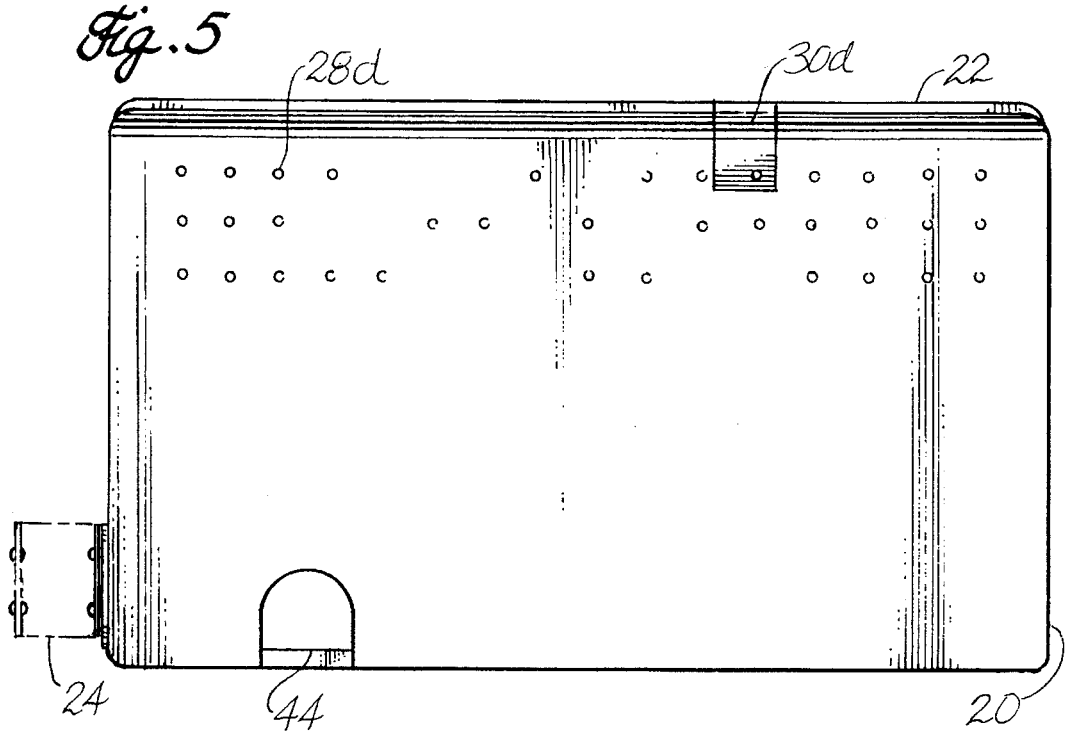
FIG. 5 is a side view of the disposable beehive illustrating the entrance/exit hole, the closure means, and ventilation holes.

FIG. 2 is a top view of the beehive 10, with the lid 22 removed to show the interior. The entrance/exit hole 44 allows the bees to enter or exit the enclosure when the sliding door 24 is open. The sliding door 24 is a plastic strip that slides in the slot 25, providing a means to open or close the beehive by covering or uncovering the entrance/exit hole 44. The slot 25 is formed within the cardboard side of the enclosure 20, between the side edge 18 and the entrance/exit hole 44.

The bottom of the inside of enclosure 20 is fitted with a block 38, comprising a plurality of cardboard layers. The layers of the block 38 are removed to form discrete empty spaces, such as nest pocket 40 and dry feed pocket 42. Multiple pockets can be similarly formed as desired. The nest pocket 40 provides a nesting place for the bees and the dry feed pocket 42 functions as a receptacle for dry feed.

As constructed the beehive 10 is substantially biodegradable since the bulk of the hive is constructed from paper products. The sliding door 24 and float feeder 27 in the preferred embodiment are plastic and can either be re-used or recycled, if desired.

It is apparent from the foregoing that various changes and modifications may be made without departing from the invention. Accordingly, the scope of the invention should be limited only by the appended claims wherein what is claimed is:

What is claimed is:

1. A beehive comprising:

an enclosure formed of wax-coated cardboard;

an entrance/exit hole in the enclosure;

closure means for covering the entrance/exit hole in the enclosure;

ventilation holes in the enclosure, the holes being small relative to the size of a bee;

a nest pocket inside the enclosure; and a float feeder comprising a main body, and a feeder element, wherein the float feeder is mounted on the enclosure such that the main body of the feeder is external to the enclosure while the feeder element is internal to the enclosure.

2. A beehive as claimed in claim 1 in which the enclosure comprises waxed corrugated cardboard layers.

3. A beehive as claimed in claim 1 in which the enclosure contains a plurality of nest pockets.

4. A beehive as claimed in claim 1 in which the enclosure contains a dry feed pocket.

5. A beehive as claimed in claim 1 in which the nest pocket comprises a plurality of cardboard layers fitted to the bottom of the enclosure, with a portion of the layers removed to leave a volume of desired size.

6. A beehive as claimed in claim 1 in which the enclosure further comprises a slot between entrance/exit hole and the nearest side edge of the enclosure.

7. A beehive as claimed in claim 6 in which the closure means comprises a plastic strip affixed within the slot, wherein the plastic strip can slide within the slot to cover or uncover the entrance/exit hole in the enclosure.

8. A beehive comprising:

a disposable, biodegradable enclosure open on top, formed of wax-coated cardboard, a disposable, waxed cardboard lid comprising a single layer of wax-coated cardboard fastened to the open top of the enclosure;

an entrance/exit hole in the enclosure;

closure means for covering or uncovering the entrance/exit hole in the enclosure;

a float feeder comprising a main body and a feeder element, said float feeder mounted on the enclosure such that the main body of the feeder is external to the enclosure while the feeder element is internal to the enclosure;

ventilation holes in the enclosure such that air can flow between the inside and outside of the enclosure, the holes being small relative to the size of a bee; and a nest pocket in the enclosure comprising a plurality of cardboard layers fitted to the bottom of the enclosure with a portion of the layers removed to leave a volume of desired size.

9. A beehive as claimed in claim 8 in which the enclosure contains a plurality of nest pockets.

10. A beehive as claimed in claim 8 in which the enclosure contains a dry feed pocket.

11. A beehive as claimed in claim 8, in which the enclosure further comprises a slot in the cardboard wall between the entrance/exit hole and the nearest side edge of the enclosure.

12. A beehive as claimed in claim 11, in which the closure means comprises a plastic strip oriented within the slot in the enclosure, wherein the plastic strip can slide within the slot to cover or uncover the entrance/exit hole.

* * * * *